United States Patent [19]

Mason

[11] Patent Number: 5,280,381
[45] Date of Patent: Jan. 18, 1994

[54] PROCESS FOR PREPARING A SOLID POLYMERIC FAST ION CONDUCTING LAYER FOR AN ELECTROCHROMIC DEVICE

[75] Inventor: Claude F. Mason, Ypsilanti, Mich.

[73] Assignee: Ford Motor Company, Dearborn, Mich.

[21] Appl. No.: 919,320

[22] Filed: Jul. 27, 1992

[51] Int. Cl.$^5$ ............................ G02F 1/153; C09J 5/00
[52] U.S. Cl. .................................... 359/268; 359/270; 359/265; 156/276; 156/305
[58] Field of Search ............... 359/272, 270, 268, 265; 156/276, 305, 307.5

[56] References Cited

U.S. PATENT DOCUMENTS

| | | | |
|---|---|---|---|
| 3,655,482 | 4/1972 | Schildkraut et al. | 156/276 |
| 4,110,015 | 8/1978 | Reddy | 359/270 |
| 4,435,048 | 3/1984 | Kamimori et al. | 359/270 |
| 4,721,649 | 1/1988 | Belisle et al. | 156/276 |
| 4,741,603 | 5/1988 | Miyagi et al. | 359/272 |
| 4,824,508 | 4/1989 | McIntyre et al. | 156/276 |
| 5,189,549 | 2/1993 | Leventis et al. | 359/271 |
| 5,216,536 | 6/1993 | Agrawal et al. | 359/274 |

FOREIGN PATENT DOCUMENTS 59-185328 10/1984 Japan.

*Primary Examiner*—Bruce Y. Arnold
*Assistant Examiner*—Evelyn A. Lester
*Attorney, Agent, or Firm*—Lorraine S. Melotik; Roger L. May

[57] ABSTRACT

A solid polymeric fast ion conducting layer for an electrochromic device is prepared by forming a plurality of partially cured fast ion conducting polymer spacers, inserting the spacers and additional fast ion conducting polymer between an electrochromic material layer and a counterelectrode, and fully curing the spacers and fast ion conducting polymer.

10 Claims, No Drawings

PROCESS FOR PREPARING A SOLID POLYMERIC FAST ION CONDUCTING LAYER FOR AN ELECTROCHROMIC DEVICE

FIELD OF THE INVENTION

This invention relates generally to the manufacture of electrochromic devices. More particularly, the invention is directed to a process for preparing a solid polymeric fast ion conducting layer for an electrochromic device, by establishing and maintaining the spacing between an electrochromic material layer and counterelectrode while the solid polymeric fast ion conducting material polymerizes to form a solid layer.

BACKGROUND OF THE INVENTION

Generally, in a multi-layered device for modulating color or transmissivity employing an electrochromic material, a physical/chemical change is produced within the electrochromic material layer in response to electron or ion transfer caused by an externally applied electrical potential. This change results in modulation of the color and transmissivity of the device with respect to electromagnetic radiation directed thereagainst. Such devices generally comprise consecutive layers of an electrochromic material, an electrolyte-containing fast ion conducting material, and a counterelectrode. The exchange of ions between the electrochromic material and fast ion conducting layers, when an electrical potential is applied across the device, comprises the mechanism by which the electrochromic material layer becomes either bleached (substantially transparent, either lightly colored or colorless) or deeply colored (substantially opaque). By reversing the polarity of the electrical potential applied across the device, it may be "switched" between the bleached and opaque states. Depending upon the magnitude and duration of the applied electrical potential, an intermediate, generally colored, translucent state may be induced, wherein the electrochromic material layer contains a concentration of fast ions sufficient to reduce the transmissivity of the device to a desired level. Thus, depending upon the manner in which the device is operated, i.e., the polarity, magnitude, and duration of the voltage applied, it may be adjusted to have an electromagnetic radiation transmissivity from about 0% to greater than about 90%, with an inversely corresponding reflectivity.

In a typical electrochromic device, the electrochromic material layer comprises an inorganic metal oxide, most commonly a transition metal oxide such as, for example, tungsten oxide. Alternatively, the electrochromic material layer may comprise an electroconductive polymer such as an unsubstituted or substituted polyaniline. The electrolyte-containing fast ion conducting layer adjacent the electrochromic material layer is generally adapted to provide a positively charged light cation such as, for example, a lithium ion for insertion into the electrochromic material layer. As an example of the operation of a typical electrochromic device, when lithium ions are introduced into a tungsten oxide electrochromic material layer, the layer changes from a colorless transparent state to a dark blue-black color. Where the tungsten oxide electrochromic material layer is sufficiently thick, the induced coloration causes the tungsten oxide electrochromic material layer to become highly absorbing opaque to electromagnetic radiation, e.g., radiation in the visible portion of the electromagnetic spectrum.

The counterelectrode of an electrochromic device generally comprises a transition metal oxide layer such as, for example, vanadium oxide or tungsten oxide, or an electroconductive polymer such as, for example, a polypyrrole or polythiophene.

The electrolyte-containing fast ion conducting layer may be a liquid electrolyte solution such as, for example, lithium perchlorate in propylene carbonate, a gel such as, for example, a solution of polyvinyl butyral in methanol doped with lithium chloride, or a solid such as, for example, a cured polyurethane containing a lithium compound.

Where the fast ion conducting layer is a liquid or gel, the spacing between the apposing surfaces of the electrochromic material layer and the counterelectrode generally is established and maintained by glass beads or plastic spacers imbedded in the fast ion conducting layer. This construction also requires a seal at the peripheral edge of the device, to prevent leakage of the liquid or gel fast ion conducting material.

It is important to establish a uniform thickness for the fast ion conducting layer. This will assist in providing uniform coloration of the electrochromic device. Thus, glass beads or plastic spacers have been used in the prior art to maintain a precise gap between the electrochromic material layer and the counterelectrode.

Where the fast ion conducting layer is a solid polymeric material, glass beads or plastic spacers are likewise used to establish and maintain the spacing between the apposing surfaces of the electrochromic material layer and the counterelectrode while the fast ion conducting polymeric material cures to form a solid. However, the curing fast ion conducting polymer often shrinks during the curing process, causing the polymeric fast ion conducting layer to pull away from one or both of the electrochromic material layer and the counterelectrode. Consequently, the communication of fast ions between the electrochromic material layer and the cured solid polymeric fast ion conducting layer is diminished, resulting in poor coloring uniformity. Moreover, the glass beads or plastic spacers result in inoperative areas of the device.

U.S. Pat. No. 4,435,048 to Kamimori et al. discloses an electro-optical light controlling device, comprising consecutively an electrochromic material layer, a non-liquid electrolyte layer, and an electrode, wherein glass beads are used to establish a constant spacing between the electrochromic material layer and the electrode. Japanese Patent Application Publication No. 59-185328 illustrates the use of glass spacers between the electrochromic layers of a transmittance-adjustable glass panel.

It would be desirable to devise a process for preparing a solid polymeric fast ion conducting layer for an electrochromic device, which does not require the use of glass beads or plastic spacers. Such a process would result in a device wherein the fast ion conducting layer intimately contacts both the electrochromic material layer and the counterelectrode, and wherein the solid polymeric fast ion conducting layer would be devoid of inoperative areas.

SUMMARY OF THE INVENTION

Accordant with the present invention, a process for preparing a solid polymeric fast ion conducting layer for an electrochromic device surprisingly has been discovered. The process comprises the steps of:

A) preparing a plurality of partially cured fast ion conducting polymer spacers;

B) inserting a fast ion conducting polymer and the spacers intermediate an electrochromic material layer and a counterelectrode, the fast ion conducting polymer enveloping the spacers and intimately contacting the spacers, electrochromic material layer, and counterelectrode, the spacers being effective to establish and maintain a desired spacing between the electrochromic material layer and the counterelectrode; and C) curing the fast ion conducting polymer and spacers to form a solid polymeric fast ion conducting layer intimately bonded at its major surfaces to the electrochromic material layer and the counterelectrode.

The process of the present invention is particularly suited for preparing electrochromic automotive and architectural glazings.

DETAILED DESCRIPTION OF THE PREFERRED EMBODIMENT

The invention is directed to a process for preparing a solid polymeric fast ion conducting layer for an electrochromic device. The device comprises an electrochromic material layer, the solid polymeric fast ion conducting layer, and a counterelectrode. The electrochromic device optionally includes a substantially transparent conductive substrate in contact with the electrochromic material layer.

When a voltage is applied across the electrochromic device, i.e., by applying a positive electrical potential to the counterelectrode and a negative electrical potential to the electrochromic material layer, fast ions from the solid polymeric fast ion conducting layer migrate into the electrochromic material layer, thereby producing a color change within the electrochromic material layer. The degree to which fast ions migrate between the solid polymeric fast ion conducting layer and the electrochromic material layer is controlled by the current and the length of time that the voltage is applied. Reversing the polarity of the applied voltage reverses the migration of fast ions, from the electrochromic material layer back into the solid polymeric fast ion conducting layer. This also reverses the coloration of the electrochromic material layer.

Conductive substrates which may be employed in conjunction with the electrochromic material layer of the present invention may include virtually any material which is known to be useful for conducting electrical current and against which the electrochromic material layer may be adhered. Clearly, metals including, but not necessarily limited to, silver, gold, platinum, copper, aluminum, nickel, chromium, iron, tin, silicon, titanium, magnesium, tungsten, and zinc, as well as alloys and multiple layers thereof, may be used as conductive substrates. Furthermore, such metals may be coated onto a support material at a thickness from about 20 Angstroms to several thousand Angstroms. Suitable support materials include, but are not necessarily limited to, glass, quartz, and plastics such as polycarbonates, polyacrylics, polyesters, polystyrenics, cellulosics, and the like, as well as copolymers, blends, and laminates thereof. These support materials may be in the form of a transparent panel intended for use as an automotive or architectural glazing, a mirror, or a display device.

Alternatively, the conductive substrate may comprise a support material as listed hereinabove having a layer of a metal oxide on a surface thereof. Suitable metal oxides, which conveniently may be deposited in thicknesses from about 100 Angstroms to several thousand Angstroms, include, but are not necessarily limited to, tin oxide, indium oxide, indium- or fluorine-doped tin oxide, cadmium oxide, antimony oxide, zinc oxide, and the like, as well as mixtures and multiple layers thereof. A preferred conductive substrate comprises a glass support having a layer of fluorine-doped tin oxide from about 100 Angstroms to about 50,000 Angstroms thick thereon.

For the preparation of certain useful electrochromic devices, it is necessary that the conductive substrate be transparent. Such a transparent conductive substrate may comprise, for example, an electrically conductive metal or metal oxide layer on glass. The thickness of the metal or metal oxide layer must, of course, not be so great as to substantially block the passage of visible light therethrough. Generally, the operable thickness ranges for substantially transparent metal or metal oxide layers is from about 80 Angstroms to about 300 Angstroms for metal and about 1,000 to about 20,000 Angstroms for metal oxide, accompanied by a corresponding variance in transmissivity for the conductive substrate.

A preferred conductive substrate, comprising metal or metal oxide coated glass, may be prepared by any conventional coating process generally known in the art such as, for example, vacuum evaporation, chemical vapor deposition, sol-gel deposition, spray pyrolysis, ion plating, sputtering, etc. Methods for depositing metal and metal oxide coatings on glass are more fully set forth in Kirk-Othermer, "Concise Encyclopedia of Chemical Technology," John Wiley & Sons, Inc., 1985, pp. 477–478, which is incorporated herein by reference thereto.

The electrochromic material layer may comprise any of the transition metal compounds known in the art as useful for the manufacture of electrochromic devices, including, but not necessarily limited to, transition metal oxides, sulfides, oxysulfides, selenides, tellurides, chromates, molybdates, tungstates, vanadates, niobates, tantalates, titanates, stanates, and the like, as well as mixtures thereof. Contemplated transition metals include, but are not necessarily limited to, tungsten, titanium, vanadium, chromium, manganese, cobalt, nickel, copper, yttrium, niobium, molybdenum, silver, cerium, hafnium, tantalum, etc. Preferred transition metal compound electrochromic materials include $WO_3$, $TiO_2$, $V_2O_5$, $Mn_2O_3$, $CeO_2$, and $CeO_2$-$TiO_2$. The thickness of the transition metal compound electrochromic material layer may vary over wide limits from about 100 Angstroms to about 10,000 Angstroms. Such transition metal compound electrochromic material layers may be prepared by the conventional methods discussed hereinabove such as, for example, sputtering, reactive sputtering, pyrolysis, chemical vapor deposition, sol-gel deposition, and the like. The transition metal compound electrochromic material layer may be deposited directly onto and adhered to a conductive substrate.

The electrochromic material layer may alternatively comprise an electroactive polymer which is electrochemically grown or deposited onto a conductive substrate. Such electroactive polymers include, but are not necessarily limited to, polyheterocycles prepared from pyrrole, thiophene, aniline, carbazole, azulene, furan, and the like, as well as derivative and mixtures thereof. Notable monomers from which the electroactive polymer electrochromic material layers of the present invention may be prepared include pyrrole, N-methylpyrrole, thiophene, and 3-methylthiophene.

Preparation of the electroactive polymer electrochromic material layer may be carried out by a technique well known in the electrochemical arts utilizing an electrolysis cell containing the monomer, an organic solvent, and a polymerization electrolyte. Suitable organic solvents include, but are not necessarily limited to, acetonitrile, propylene carbonate, tetrahydrofuran, propionitrile, butyronitrile, phenylacetonitrile, dimethylformamide, dimethoxyethane, dimethylsulfoxide, pyridine, methylene chloride, and the like, as well as mixtures and aqueous solutions thereof. A preferred solvent is acetonitrile. Useful polymerization electrolytes include, but are not necessarily limited to, anion-cation pairs, wherein the cation is selected from cations such as $Li^+$, $Na^+$, $K^+$, $Cs^+$, $Mg^{++}$, $(CH_3)_4N^+$, $(C_2H_5)_4N^+$, $(C_3H_7)_4N^+$, $(C_4H_9)_4N^+$, etc., and the anion is selected from anions such as $BF_4^-$, $ClO_4^-$, $I^-$, $Br^-$, $NO_3^-$, $PF_6^-$, $AsF_6^-$, $CF_3SO_2^-$, and the like. Preferred polymerization electrolytes are lithium tetrafluoroborate and lithium perchlorate, as well as mixtures thereof. The monomer concentration is generally from about 0.005 to about 0.5 moles per liter while the polymerization electrolyte concentration is generally from about 0.01 to about 1.0 mole per liter. the electroactive polymer is deposited on a conductive substrate at a rate which depends on the monomer concentration, the potential of the conductive substrate, and the current between the conductive substrate and the electrolysis cell cathode. The electroactive polymer electrochromic material layer according to the present invention may be deposited in any thickness.

The electrochromic device of the present invention further comprises a counterelectrode. The counterelectrode may be an electrochromic material layer as described hereinabove, comprising a transition metal oxide layer or an electroactive polymer layer adhered to another conductive substrate.

A solid polymeric fast ion conducting layer is formed intermediate the electrochromic material layer and the counterelectrode, according to the present invention. The solid polymeric fast ion conducting layer comprises an ion conducting polymer matrix and an electrolyte, and is a dielectric material which conducts ions but insulates against the movement of electrons. Of course, the solid polymeric fast ion conducting layer must be ionically conductive for the particular fast ions which migrate between it and the electrochromic material layer. Generally, the solid polymeric fast ion conducting layer of the present invention has an ionic conductivity of at least about $10^{-5} (ohm \cdot cm)^{-1}$ and a negligible electronic conductivity less than about $10^{-7} (ohm \cdot cm)^{-1}$.

The polymer from which the solid polymeric fast ion conducting layer is formed may be any curable polymer resin known in the art as useful for preparing solid polymeric fast ion conducting layers for electrochromic devices. By "curable" as the term is used herein is meant that the fast ion conducting polymer hardens over a period of time to form a solid, such as, for example, by crosslinking. Curable polymers which may be crosslinked by the use of heat, catalytic initiators, crosslinking adjuvants, irradiation, etc. are well known in the art. Suitable curable fast ion conducting polymers include, but are not necessarily limited to, epoxies, glycol ethers, polyurethanes, polymethacrylates, polyacrylates, polyacrylonitriles, polystyrenics, polycarbonates, melamines, cellulosics, etc., as well as blends, copolymers, and derivatives thereof. Preferred fast ion conducting polymers include epoxy-glycol either blends.

The electrolyte of the solid polymeric fast ion conducting layer is dissolved or dispersed substantially uniformly throughout the solid polymeric fast ion conducting material. Useful electrolytes include, but are not necessarily limited to, anion-cation pairs, wherein the cation is selected from cations such as $Li^+$, $Na^+$, $K^+$, $Cs^+$, $Mg^{++}$, $(CH_3)_4N^+$, $Ag^+$, $Cu^+$, $(C_2H_5)_4N^+$, $(C_3H_7)_4N^+$, $(C_4H_9)_4N^+$, etc., and the anion is selected from anions such as $BF_4^-$, $ClO_4^-$, $I^-$, $Br^-$, $NO_3^-$, $PF_6^-$, $AsF_6^-$, $CF_3SO_2^-$, $Cl^-$, and the like, as well as mixtures thereof. The amount of electrolyte to be employed in the solid polymeric fast ion conducting layer depends upon various factors, including the particular cation-anion pair chosen, the switching rate desired, etc. Selection of a preferred electrolyte as well as its concentration in the solid polymeric fast ion conducting layer will be apparent to one ordinarily skilled in the art in view of the present disclosure. Particularly preferred electrolytes are lithium tetrafluoroborate, lithium perchlorate, and lithium nitrate, as well as mixtures thereof.

The solid polymeric fast ion conducting layer according to the present invention is formed by initially preparing a number of partially cured fast ion conducting polymer spacers. In one method for preparing the desired spacers, the curable polymer and electrolyte are thoroughly admixed and cast or otherwise formed into a slab of material. This slab is partially cured such as, for example, by heating, irradiating, or simply allowing the slab to stand for a period of time during which the fast ion conducting polymer partially crosslinks. The fast ion conducting polymer slab is then cut to form volumetric solids, such as cubes or cylindrical pellets, having heights equal to the thickness of the slab.

A plurality of the spacers thus formed are inserted between the electrochromic material layer and the counterelectrode, and are effective to establish and maintain a uniform spacing therebetween. As will readily be appreciated by one ordinarily skilled in the art, the polymer within the spacers need only be cured enough to maintain the configuration of the spacers when inserted between the electrochromic material layer and the counterelectrode. By the term "partially cured" as it is used herein is meant that the fast ion conducting polymer is crosslinked at least sufficiently so that the resulting spacers will be rigid enough to be effective to establish and maintain a desired spacing between the electrochromic material layer and counterelectrode during the subsequent step of curing the polymeric fast ion conducting material and spacers to form a solid layer as described hereinafter. The number of spacers used and their arrangement between the electrochromic material layer and the counterelectrode are a matter of routine experimentation for one ordinarily skilled in the art of preparing electrochromic devices.

Thereafter, additional fast ion conducting polymer is introduced intermediate the electrochromic material layer and counterelectrode by any conventional method such as, for example, by injecting the polymer at the edge of the electrochromic device. The fast ion conducting polymer thus introduced envelopes the spacers and intimately contacts the spacers and the surfaces of the electrochromic material layer and the counterelectrode. Generally, the peripheral edge of the device is sealed after injection of the fast ion conducting polymer, to prevent leakage of the polymer from the device.

Finally, the fast ion conducting polymer and spacers between the electrochromic material layer and the counterelectrode are fully cured to form a solid polymeric fast ion conducting layer. The fast ion conducting polymer and spacers cure together to form a monolithic layer structure having its major surfaces intimately bonded to the electrochromic material layer and the counterelectrode. Shrinkage of the spacers and polymer occurs near the end of the curing process. Thus, the spacers and polymer shrink at substantially the same rate. The polymer and spacers ultimately cure to the same degree and, therefore, shrinkage does not cause the curing solid polymeric fast ion conducting layer to delaminate from one or both of the electrochromic material layer or the counterelectrode, as usually happens when glass beads or plastic spacers are used as disclosed in the prior art. Moreover, the monolithic configuration of the solid polymeric fast ion conducting layer insures uniform ion transfer across the entire interface between the solid polymeric fast ion conducting layer and the electrochromic material layer (i.e., the solid polymeric fast ion conducting layer does not contain inoperative areas).

Alternatively, the solid polymeric fast ion conducting layer may be prepared by positioning a plurality of the spacers on the upwardly-facing surface of a horizontally positioned electrochromic material layer, pouring a quantity of a fast ion conducting polymer onto the electrochromic material layer sufficient to envelop the spacers and produce a polymer depth at least equal to the height of the spacers (this, of course, would require a dam near the peripheral edge of the electrochromic material layer), and placing the counterelectrode on top of and in contact with the fast ion conducting polymer. The spacers are effective to establish and maintain the spacing between the electrochromic material layer and the counterelectrode while the fast ion conducting polymer and spacers are fully cured.

Typically, the thickness of the solid polymeric fast ion conducting layer ranges from about 0.1 mm to about 5 mm, depending upon the starting materials and desired performance. Since a small electrical potential will provide an enormous field strength, thinner films are generally preferred over thicker ones.

In operation, means for supplying an electrical potential, such as a battery and associated electrical leads, is used to apply a voltage across the electrochromic material layer and the counterelectrode. The electrochromic device may be reversably switched between states of coloration by applying voltages in the range from about 2 volts to about $-2$ volts. Such electrochromic devices are typically operated using low voltages, and can provide suitable visual contrasts with an electron transfer of only several millicoulombs of electrical charge per square centimeter. Switching back and forth between states of coloration may be accomplished by polarity changes or voltage sweeps.

The processes described hereinabove are generally described in terms of their broadest application to the practice of the present invention. Occasionally, however, the reactions and processes as described may not be applicable to each embodiment within the disclosed scope. Those reactions and processes for which this occurs will readily be recognized by those ordinarily skilled in the art. In all such cases, either the reactions or processes may be performed successfully by conventional modifications known to those ordinarily skilled in the art, e.g., by the use of well-known starting materials, by changing to alternative conventional reagents, by routine modification of reaction conditions, etc., or other reactions or processes which are otherwise conventional will be applicable to the practice of the present invention.

EXAMPLE

A plurality of partially cured fast ion conducting polymer spacers are prepared by mixing together about 170 ml of dry methanol, about 0.02 ml of 10% nitric acid, and about 60 ml of tetramethyl orthosilicate. The mixture is stirred and heated to a temperature of about 50° C. Tetraethylene glycol (about 120 ml) is added to the mixture which is continuously stirred at a temperature of about 50° C. for about 2 hours. A solution of about 75 gm of lithium nitrate in about 250 ml of methanol is added to the reaction mixture which is continuously stirred at a temperature of about 50° C. for about an additional 24 hours. This reaction mixture is then dried in a vacuum oven at a pressure of about 0.1 inch Hg and a temperature of about 75° C. until substantially all of the methanol is evaporated from the reaction mixture.

About 6 parts by weight of the dried reaction mixture is combined with about 2 parts by weight of 1,4-butanediol diglycidyl ether and about 1 part by weight of diethylene triamine, and mixed thoroughly. The resultant fast ion conducting polymer is formed into a slab between two sheets of polytetrafluoroethylene. This slab of material is partially cured, by allowing it to stand at room temperature for about 3 hours. The resultant partially cured slab is then cut into small cubes, to be used as spacers.

The spacers are placed in a random pattern on the exposed surface of an electrochromic material layer which has been deposited onto a tin-oxide coated glass substrate. Additional uncured fast ion conducting polymer is poured onto the exposed surface of the electrochromic material layer. The additional fast ion conducting polymer envelopes the spacers and attains a depth equal to the height of the spacers (a dam at the periphery of the electrochromic material layer prevents horizontal flow of the fast ion conducting polymer. A counterelectrode is placed on top of and in contact with the fast ion conducting polymer). The spacers are effective to establish and maintain the spacing between the electrochromic material layer and the counterelectrode during the curing process.

Finally, the fast ion conducting polymer and spacers are cured by allowing the assembly to stand at room temperature for a period of about 24 hours. The solid polymeric fast ion conducting layer thus produced is intimately bonded at its major surfaces to the electrochromic material layer and the counterelectrode.

This Example may be repeated with similar success by substituting the generically or specifically described reactants and/or reaction conditions recited herein for those used in the preceding Example.

From the foregoing description, one ordinarily skilled in the art can easily ascertain the essential characteristics of this invention, and without departing from its spirit and scope, can make various changes and modifications in the invention to adapt it to various usages and conditions.

What is claimed is:

1. A process for preparing a solid polymeric fast ion conducting layer for an electrochromic device of the type including an electrochromic material layer, a counterelectrode, and a solid polymeric fast ion conducting layer therebetween, comprising the steps of:
   A) preparing a plurality of partially cured fast ion conducting polymer spacers;
   B) inserting a fast ion conducting polymer and the spacers intermediate an electrochromic material layer and a counterelectrode, the fast ion conducting polymer enveloping the spacers and intimately contacting the spacers, electrochromic material layer, and counterelectrode, the spacers being effective to establish and maintain a desired spacing between the electrochromic material layer and the counterelectrode; and
   C) curing the fast ion conducting polymer and spacers to form a solid polymeric fast ion conducting layer intimately bonded at its major surfaces to the electrochromic material layer and the counterelectrode.

2. The process for preparing a solid polymeric fast ion conducting layer for an electrochromic device according to claim 1, wherein step A comprises:
   A) forming a slab of fast ion conducting polymer;
   B) partially curing the slab; and
   C) cutting the slab into volumetric solid spacers.

3. The process for preparing a solid polymeric fast ion conducting layer for an electrochromic device according to claim 1, wherein step B comprises:
   A) inserting the spacers between the electrochromic material layer and the counterelectrode; and
   B) introducing fast ion conducting intermediate the electrochromic material layer and counterelectrode.

4. The process for preparing a solid polymeric fast ion conducting layer for an electrochromic device according to claim 1, wherein step B comprises:
   A) positioning the spacers on a surface of the electrochromic material layer;
   B) pouring a quantity of fast ion conducting polymer onto the electrochromic material layer sufficient to envelop the spacers and produce a fast ion conducting polymer depth at least equal to the height of the spacers; and
   C) placing the counterelectrode on top of and in contact with the fast ion conducting polymer.

5. The process for preparing a solid polymeric fast ion conducting layer for an electrochromic device according to claim 1, wherein the fast ion conducting polymer comprises curable polymer and electrolyte.

6. The process for preparing a solid polymeric fast ion conducting layer for an electrochromic device according to claim 5, wherein the polymer is selected from the group consisting of epoxies, glycol ethers, polyurethanes, polymethacrylates, polyacrylonitriles, polystyrenics, polycarbonates, melamines, cellulosics, and blends, copolymers, and derivatives thereof.

7. The process for preparing a solid polymeric fast ion conducting layer for an electrochromic device according to claim 6, wherein the polymer comprises an epoxy-glycol ether blend.

8. The process for preparing a solid polymeric fast ion conducting layer for an electrochromic device according to claim 5, wherein the electrolyte is an anion-cation pair selected from the group consisting of $Li^+$, $Na^+$, $K^+$, $Cs^+$, $Mg^{++}$, $(CH_3)_4N^+$, $Ag^+$, $Cu^+$, $(C_2H_5)_4N^+$, $(C_3H_7)_4N^+$, $(C_4H_9)_4N^+$, $BF_4^-$, $ClO_4^-$, $I^-$, $Br^-$, $NO_3^{31}$, $PF_6^-$, $AsF_6^{31}$, $CF_3SO_2^-$, $Cl^-$, and the like, as well as mixtures thereof.

9. The process for preparing a solid polymeric fast ion conducting layer for an electrochromic device according to claim 8, wherein the electrolyte is selected from the group consisting of lithium tetrafluoroborate, lithium perchlorate, lithium nitrate, and mixtures thereof.

10. The process for preparing a solid polymeric fast ion conducting layer for an electrochromic device according to claim 1, wherein the thickness of the solid polymeric fast ion conducting layer ranges from about 0.1 mm to about 5 mm.

* * * * *